Oct. 27, 1959     W. D. ULRICH     2,909,975
PIPE LINE PHOTOGRAPHING APPARATUS
Filed May 20, 1957     3 Sheets-Sheet 1

INVENTOR:
William D. Ulrich
Attorneys

Oct. 27, 1959   W. D. ULRICH   2,909,975
PIPE LINE PHOTOGRAPHING APPARATUS
Filed May 20, 1957   3 Sheets-Sheet 2

INVENTOR:
William D. Ulrich
By Smyth & Roston
Attorneys

Oct. 27, 1959     W. D. ULRICH     2,909,975
PIPE LINE PHOTOGRAPHING APPARATUS
Filed May 20, 1957     3 Sheets-Sheet 3
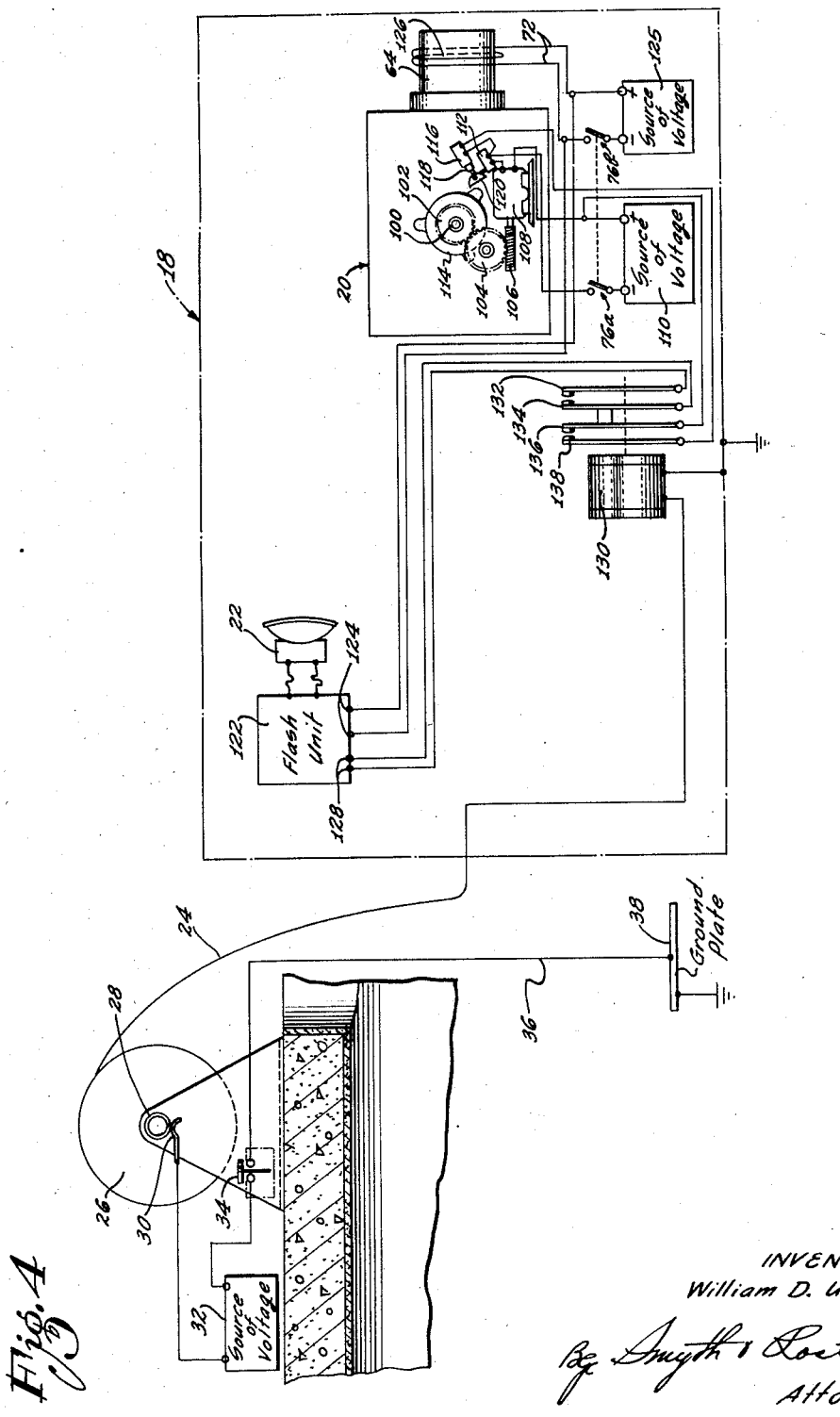
INVENTOR:
William D. Ulrich
By Smyth & Roston
Attorneys

United States Patent Office 2,909,975
Patented Oct. 27, 1959

2,909,975

PIPE LINE PHOTOGRAPHING APPARATUS

William D. Ulrich, Mar Vista, Calif.

Application May 20, 1957, Serial No. 660,242

9 Claims. (Cl. 95—11)

The present invention is directed to apparatus for photographing the interior of pipe lines. More particularly, the invention is concerned with photographing units which are adapted to float on the liquid sewage in sewer pipes to photograph the interior of such sewer pipes at spaced intervals.

Copending application Serial No. 486,328 which was filed February 7, 1955 in the name of Albert J. Baggs and William D. Ulrich discloses a boat which is particularly designed to float on the sewage in sewer pipes. The boat is equipped with a camera and with an actuator for periodically actuating the camera. This actuator automatically actuates the camera at spaced timed intervals. The boat in the copending application also supports a unit for radiating a signal back to the surface each time the camera is actuated. A control mechanism at the surface responds to this signal to play out a predetermined length of cable so that the boat can move to its next position in the sewer pipe. By this means, photographs may be taken in a fully automatic manner at spaced positions along the sewer pipe, or in any other pipe line for that matter, whose interior is to be examined.

Units of the type disclosed in the copending application, and with which the present invention is concerned, are extremely useful in sewer engineering, maintenance and research. Color photographs are possible with the equipment, and such photographs enable the researcher to analyze the color differentials and thereby determine the accumulation of anaerobic slimes. Such slimes create sulphuric acid which attacks all known materials presently used in sewer construction. The engineer, on the other hand, can use the photographs to check the sewer for misalignments and faulty sewer joints and so forth. The maintenance man, likewise, can use the photographs to check suspected failure areas so that the exact point of failure or impending failure of the sewer can be determined. This latter aspect of the invention permits the sewer to be opened at the exact point of failure so that repair costs are minimized.

The unit of the present invention is similar in some respects to that of the copending application referred to above. However, the present unit is simplified to a large extent as compared with the unit of the copending case.

The photographing unit of the invention is constructed in an improved and simplified manner to be susceptible to electrical control from above the surface. Also, the necessary electrical controls for the unit are achieved by a simple two-path electrical connection from the surface to the unit. One path is conveniently an electrical conductor which may be composed, for example, of a stainless steel wire. This wire is preferably incorporated in a plastic cable which, in turn, is supported on a winch at the entrance of the pipe line. This cable is secured to the unit to control the position of the unit in the pipe line.

The photographing unit of the invention preferably is housed in a metallic boat so that electrical contact may be made with the liquid sewage in the pipe line on which the boat is floating. The second path of the electrical connection from the unit to the surface is made through the liquid sewage. A ground plate is immersed in the sewage at the entrance to the pipe line, and a connection is made to this ground plate through an appropriate lead to complete the electrical control circuit from the surface to the unit.

The unit of the invention, as supported on the boat referred to above, preferably includes a shutterless camera incorporating a film advancing mechanism, a high intensity source of light, and a flash unit for controlling the light source to energize the same for an instant. This control of the light source causes it to glow brightly and illuminate the sewer, and at the same time the light functions to expose a frame of the film in the camera.

A source of pressurized gas, such as nitrogen, is carried by the unit of the invention. This gas is released into the lens system of the camera and into the interior of the boat in a manner to be described. The use of such gas prevents condensation on the lens and enables the unit to be used even under conditions wherever condensation would normally occur. Also, the maintenance of a slight pressure in the interior of the boat militates against any tendency for liquid to seep into the boat. Electric heating means is also provided for the camera lens further to assist in preventing condensation, as will be described.

A local source of electric energy is carried on the boat, and this source is hermetically sealed in the hull of the boat. There are, therefore, no external power cables which could have a tendency to spark and ignite volatile gases that often form in sewer systems.

A relay means is provided in the boat for controllably firing the flash unit and for subsequently connecting the film advancing mechanism to the local source of electric energy. This causes a picture to be taken, and it then causes the film in the camera to be advanced to the next frame in readiness for the next picture. This relay means is actuated from the exterior of the sewer over the two path electrical connection described above. The small relay-actuating current flowing over this path is not sufficient to create any danger of gas ignition, and an important feature of the invention is that the unit is absolutely safe for use in all sewers or other pipelines, and even under high volatile gaseous conditions.

Therefore, merely by playing out the cable a predetermined amount and by actuating a switch at the surface, the unit of the invention can be controlled to photograph the sewer pipe at a particular position in the pipe. Then, by playing out a further predetermined length of cable, the boat may be advanced in the sewer pipe to a next station. Actuation of the switch at the second station causes a second photograph to be taken at that station. These operations can be repeated at spaced distances of the boat along the entire length of the sewer pipe.

By marking the cable lengths, the actual position in the sewer pipe of each picture can be precisely determined. Alternately, the cable can be fed through a footage counter or meter. This latter instrument usually includes a pulley around which the cable is completely wound. The pulley describes exactly one revolution for each foot of cable played out. The pulley has an actuating arm attached to it which actuates a counter for each revolution of the pulley.

The improved apparatus of the present invention is relatively simple and economical to construct, yet it is extremely accurate and reliable in its operation. Moreover, the apparatus of the invention does not create any explosion hazards in the sewer in which it is used, it is simple to operate, and precise records can be made even by the most inexperienced operator.

Further features of the improved apparatus and system of the present invention will become evident from the following description when taken in conjunction with the accompanying drawings in which:

Figure 1 is a cross-sectional view of a typical sewer pipe, and illustrates the improved photographic unit of the present invention floating in the liquid sewage in the pipe, this view also showing a first electrical connection to the unit which extends through a cable which is used to control the position of the unit in the sewer pipe and a second electrical connection which is made by means of a ground plate in the liquid sewage and through the liquid sewage in the sewer pipe;

Figure 4 is a schematic representation of various electrical and mechanical components which make up the unit of the invention, and this latter representation also shows the various circuit connections between the components.

Figure 1:
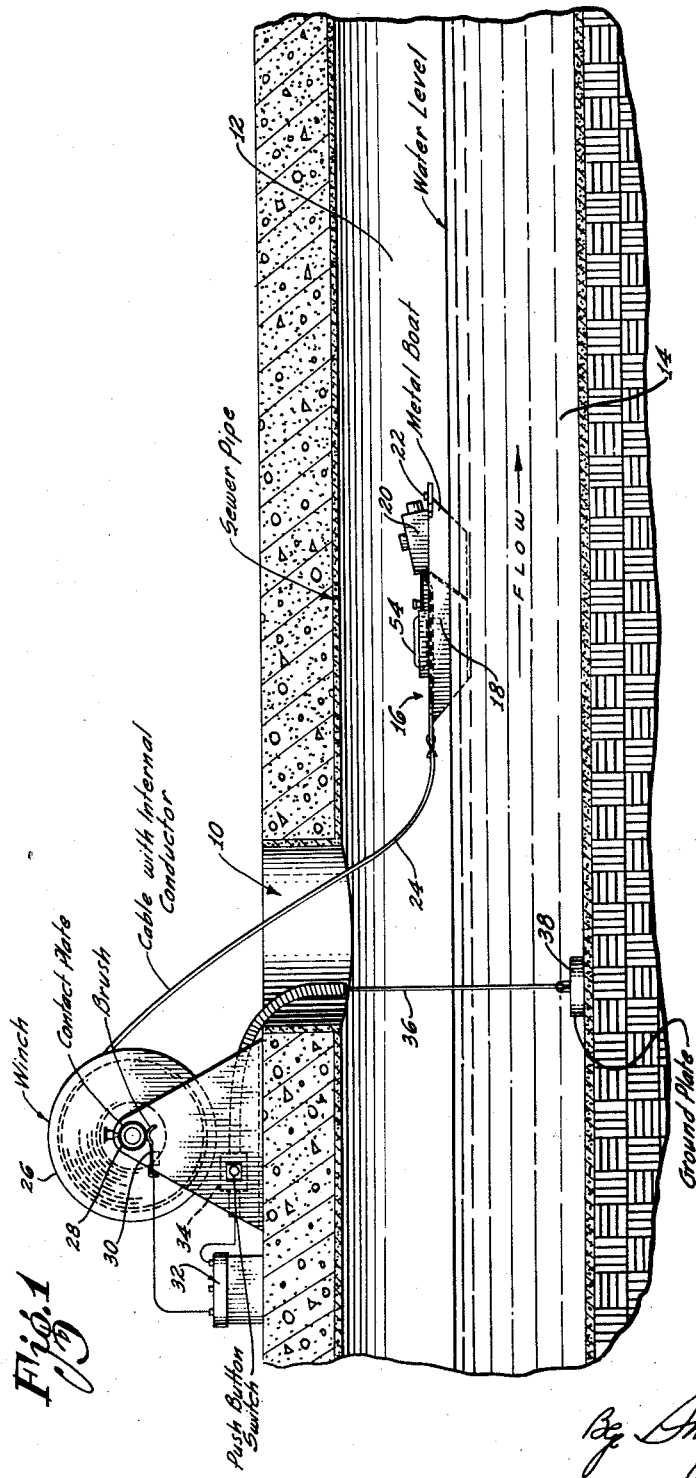

As shown in Figure 1, the photographic unit of the invention is adapted to be inserted through a manhole 10, or any other entrance, into a sewer pipe 12. Although the invention will be described as used in conjunction with sewer lines with which it finds its greatest utility, it will be understood that the invention is appropriate for photographing the interior of any type of pipe line through which a fluid passes.

Liquid sewage 14 is shown as flowing through the sewer line 12 in a direction from the left to the right in Figure 1. The apparatus of the invention is indicated as 16, and the various components of the apparatus are supported and mounted on a vehicle 18. This vehicle is in the form of a boat-like structure which is adapted to float on the liquid sewage 14 in the pipe line 12. The liquid sewage is of the type which is capable of conducting electricity, and the boat 18 is preferably formed of a metallic or other electrical conductor so that appropriate electrical connection can be made between the boat and the liquid sewage. This permits an electrical path to be established to various operating components in the boat, in a manner to be described.

The apparatus includes a camera 20 which is mounted on the boat 18 and which is controlled in a manner to be described. The camera 20 is of the type, preferably, capable of taking a picture throughout a 180° arc. A high intensity electric lamp 22 is also supported on the boat 18. This lamp, in a manner to be described, may in one embodiment of the invention be controlled so that it is energized briefly to provide a high intensity of light in the sewer line to expose the film in the camera 20. In this embodiment, the camera 20 does not require a shutter, and exposures are made merely by the brief illumination of the pipe line by the lamp 22. The lamp 22 and the camera 20 are controlled by various units supported in the interior of the boat 18 as will be described.

The boat 18 floats down the sewer on the liquid sewage 14, and its position in the sewer is controlled by a cable 24 which is fastened to the stern of the boat. The cable 24 extends up through the manhole 10 out of the sewer and around a winch 26, the winch being positioned externally of the sewer adjacent the manhole 10. The cable 24 is preferably composed of a plastic substance, and a stainless steel wire is passed down through the center of the cable to provide one electrical path to the electrically operated components of the apparatus 16. The winch 26 has a contact disk 28 supported on one side coaxial with its axis of rotation. The disk 28 is electrically conductive, and it is electrically connected to the end of the stainless steel wire in the cable 24. A conductive brush 30 is supported by any suitable stationary bracket means to make rubbing contact with the periphery of the disk 28. This brush is connected to the positive terminal, for example, of a source of electrical energy, such as a battery 32. The negative terminal of the battery is connected to one terminal of a push button switch 34. The other terminal of the switch 34 is connected over a conductor 36 to a metallic ground plate 38. The ground plate 38 is lowered down into the sewer and submerged in the liquid sewage 14. In this manner, an electric circuit is completed to the components in the boat 18 through the liquid sewage 14 and through the electrically conductive hull of the boat 18.

In the manner described in the preceding paragraph, a complete electrical circuit to the electrical components in the boat 18 can be traced. This circuit extends from the positive terminal of the source 32, through the brush 30 and the conductive disk 28 to the wire at the center of the cable 24. The circuit then extends through the components of the boat 18 and to the metallic hull of the boat. The return circuit then extends through the liquid sewage 14 to the ground plate 38 and back through the conductor 36 and the switch 34 to the negative terminal of the source 32.

Figure 2:
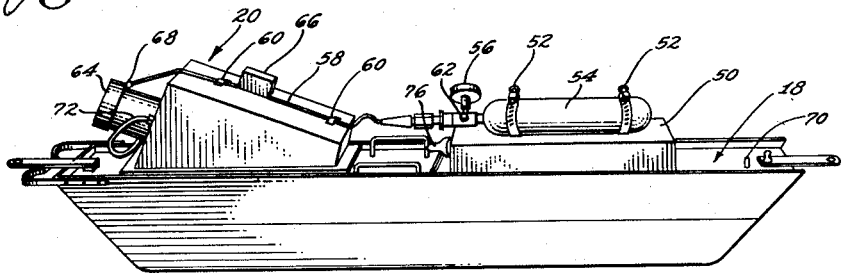
Figure 2 is a side perspective view of the improved photographic unit of the present invention showing in particular the hull structure of the vehicle which supports the photographic and other equipment, and which is adapted to float on the liquid sewage in the sewer and also showing several components supported on the deck of the hull.
Figure 3:
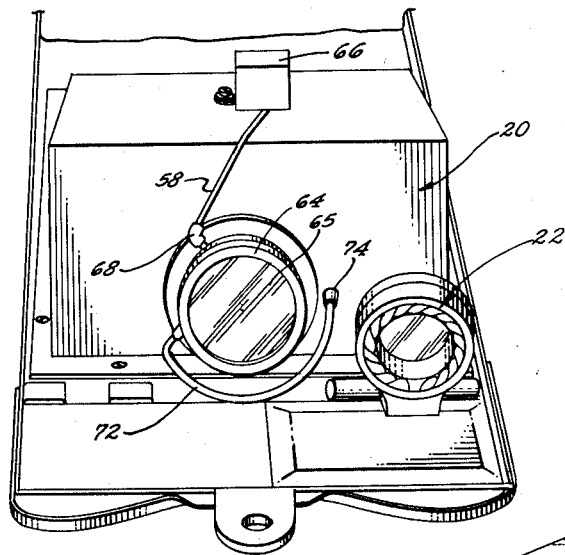
Figure 3 is a front perspective view of the unit.

As shown in Figures 2 and 3, the boat 18 includes a hull having a barge-like shape. The camera 20 and the lamp 22 are mounted on the upper deck of the hull; and these components are contained in water-proof, hermetically sealed units which are fastened to the hull. The boat includes a hatchway 50 which permits access to the interior of the hull.

An electronic flash unit which will be described, a source of electric energy such as one or more batteries, and other various components, are supported within the hull. The hatchway 50 has a cover which is also hermetically sealed to the hull so that there is no possibility of liquid entering the interior of the hull and damaging the components contained in it. The hatchway cover has a pair of brackets 52 which are adapted to support and mount a container 54 of a pressurized gas, such as nitrogen. The container has a usual pressure gauge 56 coupled to it to indicate the quantity of gas remaining in it. A feed line 58 extends forward from the pressure gauge, and the feed line extends up over the housing of the camera 20. The feed line is secured to this housing by a series of small mounting brackets 60. The container 54 may be about 10" long and 2" in diameter, and is capable of holding about 1200 p.s.i. of the gas.

A manual control valve 62 is interposed between the feed line 58 and the pressure gauge 56. A pressure regulator 66 is also interposed in the feed line. The feed line extends into the interior of a watertight protective housing 64 for the lens of the camera 20. A jet nozzle 68 couples the feed line into the housing 64, and this nozzle directs a stream of gas against the inside of the transparent face plate 65 of the housing 64. This face plate may be conveniently formed of a transparent plastic such as "Lucite."

The stream of gas referred to above prevents condensation from forming on the interior of the face plate 65 of the housing. The gas is bled through the pressure regulator 66 at an extremely low rate. The gas escapes from the lens protective housing 64 into the interior of the boat and maintains the interior at a raised pressure. As noted previously, this eliminates any tendency for liquids to seep into the interior of the boat. The gas escapes from the boat through a release valve 70. This release valve is mounted on the upper deck of the boat near the stern, and it has a usual known construction, and it is set (for example) to release whenever the internal hull pressure exceeds 1.5 p.s.i.

A heater coil, which will be described, is wound around the case of the lens protective housing 64, and the case is enclosed in a watertight coating. An electric cable 72 extends to this coil, and electric current is fed to the coil by the cable to generate heat and maintain the lens in a heated condition. This, as noted previously, also serves to eliminate any condensation on the lens. The cable 72 extends into the interior of the hull through a water-proof electric plug 74.

A main switch 76 has a rubber encased actuating lever extending through the hatchway cover 50. This switch serves to connect the various electrical components contained within the hull to their corresponding energizing sources.

The various components that are contained in the hull of the boat 18 are shown within the dotted rectangle of Figure 4. The camera 20 has a reel of film mounted in it in accordance with usual motion picture camera techniques, and the film is driven by a film advancing mechanism which includes a shaft 100. As the shaft is rotated, the film is drawn past the lens 64 so that images directed through the lens may be focused on successive frames of the film. As noted above, the camera 20 may be of the shutterless type. Whenever the lamp 22 is flashed, the film in the camera is exposed, and the film advancing mechanism is then actuated to draw the next film frame into position in readiness for the next picture.

A gear 102 is keyed to the shaft 100, and this gear is coupled in meshing relation with a second idler gear 104. The idler gear 104 is rotatably mounted on the camera 20, and this gear is engaged by a worm gear 106. The worm gear 106 is driven by a suitable electric motor 108 which is mounted on any appropriate stationary bracket (not shown).

One terminal of the motor 108 is connected to the positive terminal of a source of electrical energy, such as a battery 110, which may, for example, be three 6-volt dry cells and which are supported in the interior of the boat 18. The other terminal of the motor 108 is connected to one terminal of a switch 112 which may be a microswitch, and the other terminal of the switch 112 is connected through a section 76a of the switch 76 referred to above to the negative terminal of the source 110.

The microswitch 112 is of the normally closed type, and when this switch is not actuated, the motor 108 is energized and the film advancing mechanism is driven through the gears 106, 104 and 102 to move the film within the camera 20.

A cam 114 is also keyed to the shaft 100 of the film advancing mechanism, and the cam has a series of radial projections spaced about its periphery. The angular distance between any two of these projections corresponds to the rotational distance required for the film advancing shaft 100 to move the film from one film frame to the next succeeding frame.

A solenoid 116 is positioned on any suitable supporting means to have its armature 118 extend between the actuating button of the microswitch 112 and the cam 114. The actuating button of the switch 112 is normally spring biased to its outer position and the switch is closed (as noted above). The armature 118 has a switch actuating member 120 pivoted to its outer end. When the solenoid 116 is de-energized, the switch actuator 120 extends between the cam 114 and the actuating button of the microswitch 112. Whenever one of the projections of the cam 114 moves against the actuator 120, it causes the actuator to move the actuating button of the microswitch 112 inwardly to open the microswitch. This causes the energizing circuit to the motor 108 to be broken and the motor is stopped.

Therefore, when the solenoid 116 is energized, its armature 118 draws the actuator 120 away from the button of the microswitch 112. This causes the microswitch to close so that the motor 108 is energized. The film advancing mechanism is therefore actuated, and the film in the camera is advanced. When the solenoid is subsequently de-energized, its armature returns to the illustrated position. Then, the next projection on the cam 114 moves the actuator 120 down on the button of the microswitch 112 to open the microswitch to stop the motor 108. In this manner, pulsing of the solenoid 116 permits the film in the camera 20 to be advanced from one frame to the next.

The apparatus also includes an electrically actuated flash unit 122 of usual construction. This flash unit has a pair of input terminals 124 which are connected through a section 76b of the switch 76 across a source of direct voltage such as a battery 125. This battery may, for example, be a six volt wet cell and is also connected through the cable 72 to the heater coil around the lens 64. This heater coil was referred to above, and it is designated in Figure 4 as 126.

The unit 122 employs a vibrator power supply to build up a high voltage, and it includes a known type of glow discharge lamp. These lamps usually have two main electrodes, and they also include a triggering electrode for initiating a discharge between the main electrodes. The unit also includes a capacitor which is normally charged to a relatively high voltage. The unit has a pair of triggering terminals 128 and when a circuit is completed across these terminals the triggering electrode of the discharge lamp in the unit 122 causes the lamp to fire. The lamp 22 is connected in circuit with the main electrodes of the discharge lamp in the flash unit 122, and such triggering of the discharge lamp causes the capacitor to discharge through the lamp 22. This causes the lamp 22 to be briefly illuminated to present a high intensity of light to the surrounding area.

The constructional details of flash units of the type described above are extremely well known. For this reason, it is believed unnecessary to describe this unit in detail.

The apparatus in the boat 18 also includes a relay 130. The relay 130 includes an energizing coil, and one side of the coil is connected to the hull of the boat, the other side of the coil being connected to the wire in the cable 24. When the push botton 34 is depressed, the relay 130 is energized through the circuit from the source 32 described above.

The relay 130 has an armature 132, and when the relay is first energized the armature closes with a contact 134 to complete the circuit across the terminals 128 of the flash unit and fire the unit in the described manner. The contact 134 has a second contact 136 which is insulated from it, but which moves with it. When the relay is energized to close the armature 132 on the contact 134, the contacts 134 and 136 are moved in unison to the left in Figure 4 until the contact 136 makes contact with a fixed contact 138. In this manner, the relay 130, when energized, closes the armature 132 on the contact 134, and a brief interval afterwards closes the contact 136 on the contact 138.

One side of the energizing coil of the solenoid 116 is connected through the switch section 76a to the negative terminal of the source 110, and the other side of the solenoid 116 is connected through the contacts 138 and 136 to the positive terminal of that source.

Therefore, when the contacts 132 and 134 close, the solenoid 130 is energized to actuate the film advancing mechanism in the manner described above.

The winch 26 may be motor driven or it may be hand operated. To operate the system, the switch 76 is actuated so that both its sections 76a and 76b are closed. The gas valve 62 (Figure 2) is opened, and the unit is inserted into the sewer. It is then merely necessary to operate the winch so that a predetermined length of cable 24 is played out and the boat moves to its first station in the sewer line. Then, the push button 34 is depressed for a brief moment. This causes the relay 130 to be energized to flash the unit 122 and then to cause the film advancing mechanism in the camera 20 to move the film to its next position, the film having been exposed by the lighting of the lamp 22 due to the flashing of the unit 122. Then, the winch 26 is operated to move the boat to its next station and the process is repeated. This may be continued in a step-by-step manner at spaced positions along the sewer pipe until successive portions of the complete length of the pipe have been photographed.

Figure 5:
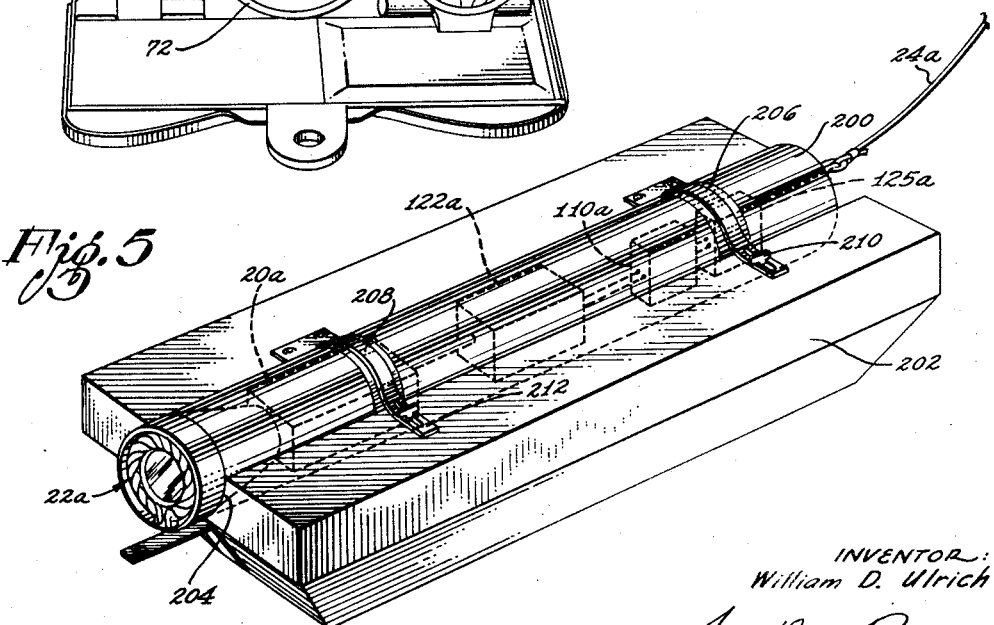
Figure 5 is a perspective view of another embodiment of the invention.

The embodiment of Figure 5 provides an improved combination whereby the operating components of the unit are mounted in a cylindrical container 200 which is preferably composed of an electrically conductive substance. Then, the container 200 may be drawn through pipe lines of relatively small diameter when it is desired to photograph the interior of such smaller pipe lines.

For the larger pipe lines, the container 200 is adapted to be clipped to a larger boat 202, and the boat 202 allowed to float through the larger pipe lines in the manner described above. The boat 202 is also composed preferably of an electrically conductive material so that it may establish contact with the container 200 which, in turn, establishes contact with the electrical components in it, in the manner described previously. The combination of the container 200 and the boat 202 provides a convenient universal unit which has a wide application for a large range of sizes of pipe lines and sewage conditions.

As shown in Figure 5, components similar to those used in the previous embodiment are mounted within the container 200. These similar components are designated by the same number in Figure 5 with the addition of an "a" to distinguish the latter components from the previous ones.

The container 200 has a transparent end which is shown to the left in Figure 5. This transparent end may be enclosed by a glass face as in the previous embodiment, and gas under pressure may be supplied to the interior of this face as before to prevent condensation, and also a suitable heating coil may be provided at this end as in the previous embodiment.

A camera 20a is mounted in the container 200 with its lens adjacent the transparent end of the container. A light source 22a is also mounted in the container. In this latter embodiment, the light source 22a has an annular configuration and is mounted so that it directly surrounds the lens system of the camera. When the light source 22a is energized, it provides a high intensity illumination which emits through the transparent end of the container 200 and which serves to expose the positioned film frame of the film in the camera 20a.

A flash unit 122a is mounted in the container 200, and this flash unit may be similar to the flash unit 122 described above. Also, suitable batteries designated as 110a and 125a are mounted within the container 200. The electrical connections between the various components in the container 200, and the film advancing mechanism and control for the camera 20a may be the same as in the previous embodiment.

The boat 202 has a cylindrical shaped channel 204 extending lengthwise across its upper deck from one end of the boat to the other. The tubular or cylindrical container 200 is adapted to fit in that channel. A pair of clips 206 and 208 are affixed to the upper deck of the boat 202. These clips are adapted to engage peripheral channels in the container 200. The clips may be latched to the upper deck by appropriate latches 210 and 212. Therefore, the container 200 may be conveniently secured to the boat 202 for the larger sewer systems, and it may be quickly and conveniently removed from the boat for smaller pipe lines. A cable 24a similar to the cable 24 of the previous embodiment extends into the rear of the container 200 and is secured to the container. As before, the cable 24a may carry an internal electrical conductor which is connected to the various components in the container in the described manner.

The invention provides, therefore, a new and improved apparatus and system in which all the necessary electronic and optical components, and their power sources, are contained and hermetically sealed within the boat itself. This obviates explosion hazards, and it permits a simple control to be effected from the surface by means of a single push button switch and by an exceedingly simple connecting link between the surface and the components in the boat.

The provisions of the gas jet and heating coils at the camera lens permits the unit to be used under the most adverse conditions without the camera lens becoming fogged due to condensation effects. Also, the latterly described embodiment permits the unit to be used through a wide variety of pipe line sizes and conditions.

A constructed embodiment of the invention has been used with a high degree of proficiency. Sharp and accurate pictures have been obtained by means of the apparatus and it has been a tremendous service to sewer design and maintenance.

Although the now preferred embodiment of the present invention has been shown and described herein, it is to be understood that the invention is not to be limited thereto, for it is susceptible to changes in form and detail within the scope of the appended claims.

I claim:

1. In apparatus for photographing the interior of a pipe line, the combination of: a vehicle for traversing the pipe line, a camera carried by said vehicle, an electrically actuated film-advancing mechanism associated with said camera, an electrically actuated film-exposing means for said camera mounted on said vehicle, at least one source of electrical energy for said film advancing mechanism and for said film-exposing means mounted on the vehicle, control means on said vehicle for selectively connecting the source of electrical energy to said film exposing means at periodic intervals to actuate said film exposing means and thereby expose film in said camera briefly at such intervals and for selectively connecting the source of electrical energy to the film advancing mechanism to actuate said film advancing mechanism and advance the film in the camera by a predetermined amount, energizing means positioned externally of the pipe line, and means including switching means external from the pipe line for connecting the energizing means to said control means.

2. In apparatus for photographing the interior of a pipe line, the combination of: a vehicle for traversing the pipe line, a camera carried by said vehicle, an electrically actuated film advancing mechanism associated with said camera, an electrically actuated flash unit mounted on said vehicle, a high intensity light source coupled to said flash unit and adapted to be energized thereby, at least one source of electrical energy for said flash unit and for said film advancing mechanism mounted on said vehicle, control means on said vehicle for selectively connecting the source of electrical energy to said flash unit to actuate said flash unit at periodic intervals thereby to energize said light source so as to provide a light of short duration in the pipe line and for selectively connecting said film advancing mechanism to said source of electrical energy to actuate the same and advance the film in the camera by a predetermined amount, an electrical energizing means positioned outside the pipe line, and means including switching means external of the pipe line for connecting the energizing means to said control means.

3. In apparatus for photographing the interior of a pipe line carrying a fluid through which electrical connection may be established, the combination of: a vehicle for traversing the pipe line and having at least a portion composed of electrically conductive material for contact with the fluid in the pipe line, a camera carried by said vehicle, an electrically actuated film advancing mechanism associated with said camera, an electrically actuated film exposing means for said camera on said vehicle, at least one source of electrical energy for said film advancing mechanism and for said film exposing means mounted on the vehicle, electrically actuated control means connected to said conductive portion of said vehicle for selectively connecting the source of electrical energy to said film exposing means to actuate said film exposing means at periodic intervals to expose film in said camera briefly at such intervals and for selectively connecting the source of electrical energy to said film advancing mechanism to actuate said film advancing mechanism and advance the film in the camera by a predetermined amount, a source of electrical energy positioned outside the pipeline, means including a switch external of the pipe line and further including means for establishing a connection to the fluid in the pipe line for selectively connecting the source of electrical energy outside the pipeline to said control means.

4. In apparatus for photographing the interior of a pipe line carrying a fluid through which electrical connection may be established, the combination of: a vehicle for traversing the pipe line and having at least a portion composed of electrically conductive material for contact with the fluid in the pipe line, a cable extending from the vehicle to a point external of the pipe line for controlling the position of the vehicle in the pipe line, a camera carried by said vehicle, an electrically actuated film advancing mechanism associated with said camera, an electrically actuated film exposing means for said camera mounted on said vehicle, at least one source of electrical energy on said vehicle for said film advancing mechanism and for said film exposing means, electrically actuated control means connected to said conductive portion of said vehicle for actuating said film exposing means at periodic intervals to expose film in said camera briefly at such intervals and for subsequently actuating said film advancing mechanism to advance the film in the camera by a predetermined amount, a source of electrical energy external of the pipe line, and connecting means including a manually operated switch positioned outside the pipe line for controllably establishing electrical connections from said external source through said cable and through the fluid in the pipe line to said control means.

5. In apparatus for photographing the interior of a pipe line, the combination of: a vehicle for traversing the pipe line, a camera carried by said vehicle, an electrically actuated film advancing mechanism associated with said camera, solenoid means for actuating said film advancing mechanism, an electrically actuated flash unit mounted on said vehicle, a high intensity light source coupled to said flash unit and adapted to be energized thereby, at least one source of electrical energy for said film advancing mechanism and for said solenoid means and for said flash unit mounted on said vehicle, relay means on said vehicle for selectively connecting the source of electrical energy to said flash unit to trigger said flash unit at periodic intervals so as to energize said light source and for subsequently connecting said source of electrical energy to said solenoid means to actuate the same and advance the film in the camera by a predetermined amount, a source of electrical energy positioned outside the pipe line, and means including switching means external of the pipe line for controllably connecting the outside source of electrical energy to said relay means.

6. In apparatus for photographing the interior of a pipe line, the combination of: a vehicle for traversing the pipe line, a camera carried by said vehicle, an electrically actuated film advancing mechanism associated with said camera, solenoid means for actuating said film advancing mechanism, a first source of electrical energy for said film advancing mechanism and for said solenoid means mounted on the vehicle, an electrically actuated flash unit mounted on said vehicle, a high intensity light source coupled to said flash unit and adapted to be energized thereby, a second source of electrical energy for the flash unit mounted on said vehicle, and relay means on said vehicle having a first pair of contacts adapted to close upon actuation of the relay means and having a second pair of contacts adapted to close subsequent to the closure of said first pair of contacts upon such actuation of the relay means, said first pair of contacts serving to trigger said flash unit at periodic intervals to energize said light source, said second pair of contacts serving to connect the solenoid means to the first source of electrical energy to actuate the film advancing means and advance the film in the camera by a predetermined amount, a source of electrical energy positioned outside the pipe line, and means including a switch positioned outside the pipe line for controllably connecting the outside source to the relay means.

7. In apparatus for photographing the interior of a pipe line, and the like, as defined in claim 6 and in which said camera carried by said vehicle includes a lens system, means on said vehicle for introducing a gas to said lens system to prevent condensation thereon.

8. In apparatus for photographing the interior of a pipe line, and the like, as defined in claim 6 and in which said camera carried by said vehicle includes a lens system, an electric heating coil associated with said lens system, and means for introducing an electric current through said heating coil.

9. In apparatus for photographing the interior of a pipe line, and the like, the combination of: a vehicle for traversing the pipe line, a camera carried by said vehicle, an electrically actuated film advancing mechanism associated with said camera including a drive shaft and further including an electric motor mechanically coupled to said drive shaft, a cam member rigidly mounted on said drive shaft, a switch means for controlling the energizing of said electric motor, a solenoid having an actuating arm which in a first operating position of the solenoid is interposed between said cam and said switch to enable said cam to operate said switch and cause said switch to be moved to an open position, said solenoid having a second operating position in which its actuating arm is withdrawn from between said cam and said switch to cause said switch to be moved to a closed position, an electrically actuated film exposing means for said camera mounted on said vehicle, at least one source of electrical energy for the film advancing mechanism and for the solenoid means and for the film exposing means supported on said vehicle, and means on said vehicle for selectively connecting the source to said film exposing means and for subsequently connecting said source of electric energy to said solenoid, and an energizing circuit for the electric motor of the film advancing mechanism extending from the source through said switch, the switch causing the motor to be energized when in its closed condition and causing the motor to be de-energized when in its open position.

References Cited in the file of this patent

UNITED STATES PATENTS

| Re. 24,076 | Laval | Oct. 18, 1955 |
| 1,331,627 | Dilts | Feb. 24, 1920 |
| 1,520,004 | Bloch | Dec. 23, 1924 |
| 2,012,456 | Kothny | Aug. 27, 1935 |
| 2,501,405 | Noel | Mar. 21, 1950 |
| 2,736,630 | Cooper | Feb. 28, 1956 |

FOREIGN PATENTS

| 839,142 | Germany | May 15, 1952 |